US008494239B2

(12) United States Patent
Kitamura, I

(10) Patent No.: US 8,494,239 B2
(45) Date of Patent: Jul. 23, 2013

(54) IMAGE PROCESSING DEVICE, METHOD AND PROGRAM

(75) Inventor: Yoshiro Kitamura, I, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 219 days.

(21) Appl. No.: 13/040,893

(22) Filed: Mar. 4, 2011

(65) Prior Publication Data

US 2011/0222748 A1  Sep. 15, 2011

(30) Foreign Application Priority Data

Mar. 11, 2010 (JP) ................................. 2010-053907
Feb. 9, 2011 (JP) ................................. 2011-025638

(51) Int. Cl.
*G06K 9/00* (2006.01)
*A61B 6/00* (2006.01)
*A61B 5/05* (2006.01)

(52) U.S. Cl.
USPC ............................... 382/128; 378/4; 600/425

(58) Field of Classification Search
USPC ................. 382/128, 129, 130, 131, 132, 133, 382/134; 600/407, 410, 425; 378/4, 8, 21–27, 378/101, 901; 128/920, 922
See application file for complete search history.

(56) References Cited

U.S. PATENT DOCUMENTS 7,660,481 B2 * 2/2010 Schaap et al. ................. 382/266
8,068,655 B2 * 11/2011 Odry et al. .................... 382/131
8,233,716 B2 * 7/2012 Kletter ........................... 382/195

OTHER PUBLICATIONS

Boykov et al., "Interactive Graph Cuts for Optimal Boundary & Region Segmentation of Objects in N-D Images", Proceedings of "International Conference on Computer Vision", vol. I, pp. 105-112, 2001.
Frangi et al., "Multiscale vessel enhancement filtering"., MICCAI, vol. 1496, pp. 130-137, 1998.
European Search Report—EP 11 15 5554—Jun. 29, 2012.
H.E. Bennink: "Analysis of Coronary Microvascular Structureson the Enhancement and Detection of Microvesselsin 3D Imaging Cryomicrotome Data", Master Thesis, Eindhoven University of Technology, Feb. 21, 2007, XP002678830, Eindhoven, The Netherlands, Retrieved from the Internet: URL:http://wssprojects.bmt.tue.nl/sites/bmia/ResultFiles/Bennink,%20H.%20Edwin%20-MSc%20thesis.pdf [retrieved on Jun. 27, 2012] *sections 4.2.1, 4.5*.
Krissian K et al.: "Model-based multiscale detection of 3D vessels", Computer Vision and Pattern Recognition, 1998. Proceedings. 1998 IEEE Computer Society Conference on Santa Barbara, CA, USA Jun. 23-25, 1998, Los Alamitos, CA, USA, IEE Comput. Soc, US, Jun. 23, 1998, pp. 722-727, XP010291702, DOI: 10.1109/CVPR.1998.698683 ISBN: 978-0/8186-8497-5 * sections 3, 4.2.3*.

(Continued)

*Primary Examiner* — Abolfazl Tabatabai
(74) *Attorney, Agent, or Firm* — Young & Thompson

(57) ABSTRACT

A second order partial derivative matrix and at least one first order partial derivative value of a pixel value at each pixel position in an image are calculated. Based on values of the calculated second order partial derivative matrix, an evaluation value of a likelihood of being a line-like structure and/or an evaluation value of a likelihood of being a plate-like structure for the pixel position are calculated, such that the larger the first order partial derivative value, the smaller the evaluation values.

19 Claims, 4 Drawing Sheets

OTHER PUBLICATIONS

Moti Freiman et al: "Vessels-Cut: A Graph Based Approach to Patient-Specific Carotid Arteries Modeling", Nov. 29, 2009, Modelling the Physiological Human: 3D Physiological Human Workshop, 3DPH 2009, Zermatt, Switzerland, Nov. 29-Dec. 2, 2009; Proceedings: [Lecture Notes in Computer Science; 5903], Springer Berlin [U.A.], pp. 1-12, XP019140837, ISBN: 978-3-642-10468-8 *section 2.2*.

* cited by examiner

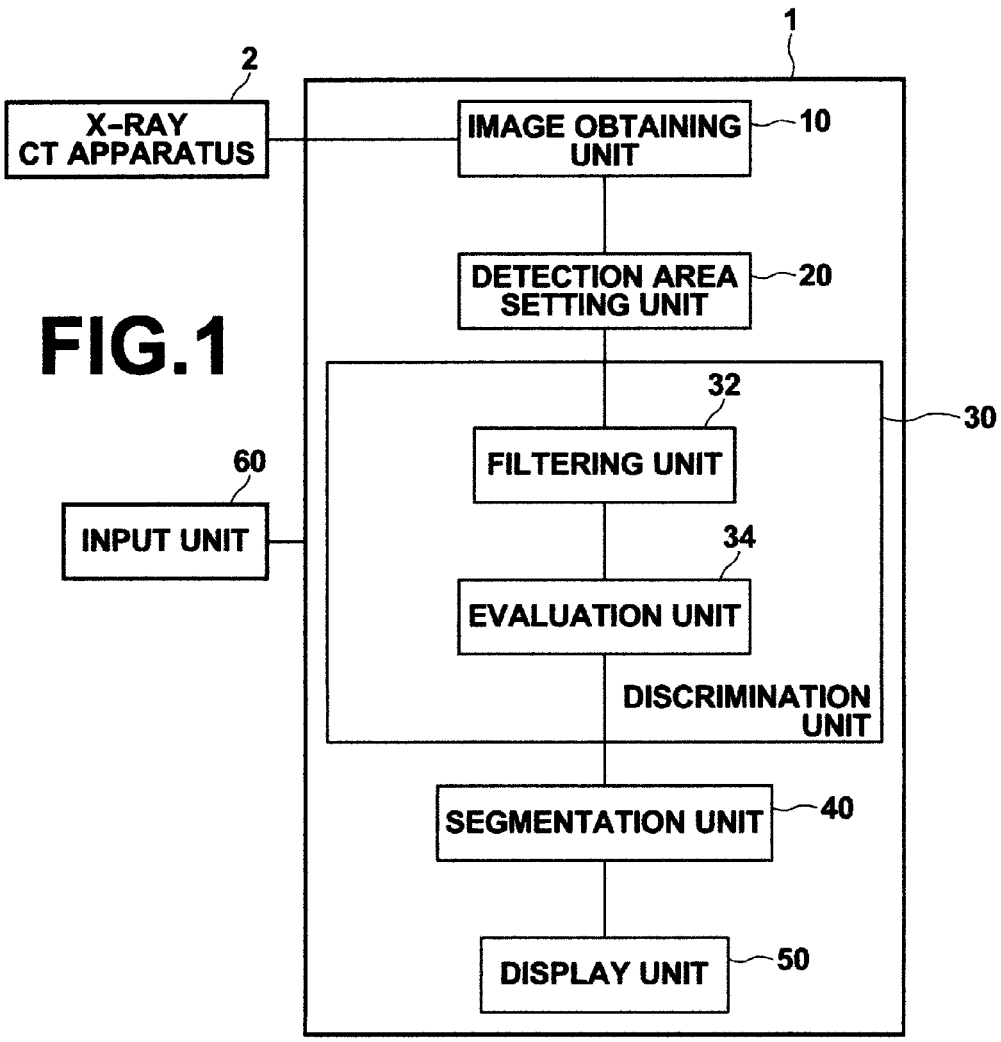
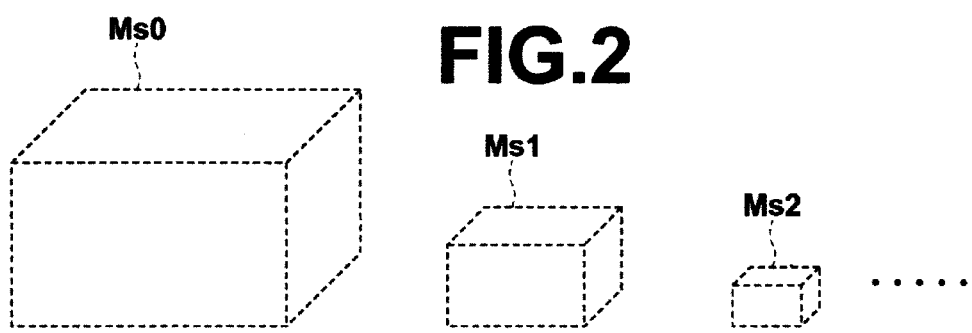

IMAGE PROCESSING DEVICE, METHOD AND PROGRAM

BACKGROUND OF THE INVENTION

1. Field of the Invention

The present invention relates to an image processing device and an image processing method for discriminating a line-like structure or a plate-like structure in an image, as well as a program for causing a computer to carry out the image processing method.

2. Description of the Related Art

Along with advancement of medical devices (such as multiple-detector CT) in recent years, high-quality three-dimensional images are used in imaging diagnosis. Such a three-dimensional image is formed from a number of two-dimensional images and thus has a large amount of information. Therefore, it may take time for a doctor to find a desired part to be observed and diagnose the part. To address this problem, it has been practiced to extract an organ of interest and display it in MIP, VR, CPR, or the like, to enhance visibility of the entire organ and a lesion, thereby improving efficiency of the diagnosis.

On the other hand, as a technique to extract a blood vessel and a bone in a medical image, Hessian analysis using a Hessian matrix has been proposed (see A. F. Frangi et. al., "Multiscale vessel enhancement filtering", MICCAI, Vol. 1496, pp. 130-137, 1998, which will hereinafter be referred to as Non-Patent Document 1). The Hessian analysis is used to analyze eigenvalues of a Hessian matrix, which contains, as its elements, second order partial derivatives calculated using a second order derivative kernel of a predetermined filter, such as a Gaussian kernel, to discriminate whether a local structure in the image is a point, a line or a surface. Use of the Hessian analysis allows discrimination of a blood vessel as a "line-like structure" and a bone as a "plate-like structure".

However, since blood vessels and bones have various thicknesses and sizes, discrimination of the blood vessels and bones may not be achieved only by using the Hessian analysis. For example, in the case where a cortical bone, such as the spine, is extracted as the plate-like structure, if a filter kernel having a size enough to detect the surface portion of the cortical bone is used, not only the plate-like structures of a bone 100 but also the surface of a thick blood vessel 102 may be discriminated as the plate-like structure, as shown by the hatched areas in FIG. 8. This problem occurs because the second order partial derivatives are high in a direction perpendicular to the surface of the thick blood vessel and are low in two directions parallel to the surface of the blood vessel, and thus the thick blood vessel shows the same characteristics as that of the plate-like structure. In contrast, in the case where a blood vessel is extracted as the line-like structure, if a filter kernel having a size enough to detect the line-like portion of the blood vessel is used, not only the portion of the blood vessel 102 forming the line-like structure but also the corner portions of the bone 100 may be discriminated as the line-like structure, as shown at the hatched areas in FIG. 9.

SUMMARY OF THE INVENTION

In view of the above-described circumstances, the present invention is directed to preventing erroneous discrimination of a line-like structure and a plate-like structure contained in an image.

A first aspect of the image processing device according to the invention includes:

derivative value calculating means for calculating a second order partial derivative matrix and at least one first order partial derivative value of a pixel value at each pixel position in an image; and evaluating means for calculating an evaluation value of a likelihood of being a line-like structure and/or an evaluation value of a likelihood of being a plate-like structure for the pixel position based on values of the second order partial derivative matrix, wherein the larger the first order partial derivative value, the smaller the evaluation values outputted by the evaluating means.

In the first aspect of the image processing device according to the invention, the derivative value calculating means may calculate the second order partial derivative matrix and the first order partial derivative value using filters having different sizes, where the filter used to calculate the first order partial derivative value has a size larger than a size of the filter used to calculate the second order partial derivative matrix.

In the first aspect of the image processing device according to the invention, the derivative value calculating means may apply multi-resolution conversion to the image to obtain resolution images having different resolutions, and calculate the second order partial derivative matrix and the first order partial derivative value with using a filter having a predetermined size at each corresponding pixel position of the resolution images, where the resolution image used to calculate the first order partial derivative value has a resolution lower than a resolution of the resolution image used to calculate the second order partial derivative matrix.

In the first aspect of the image processing device according to the invention, the derivative value calculating means may calculate the second order partial derivative matrix and the first order partial derivative value using a one-dimensional basic Gaussian kernel, a first order derivative kernel obtained through first order differentiation of the basic Gaussian kernel and a second order derivative kernel obtained through second order differentiation of the basic Gaussian kernel.

The first aspect of the image processing device according to the invention may further include segmenting means for segmenting the object area and the background area by setting a likelihood of belonging to an object area, a likelihood of belonging to a background area, and a likelihood of adjacent pixels belonging to the same area for each pixel of the image based on the evaluation values.

In this case, the segmenting means may set the likelihood of belonging to an object area based on the evaluation value of the likelihood of being a line-like structure, and may set the likelihood of belonging to a background area based on the evaluation value of the likelihood of being a plate-like structure.

Further, the segmenting means may set the likelihood of belonging to the same area based on an evaluation value of the likelihood of being a line-like structure and an evaluation value of the likelihood of being a plate-like structure for the pixel position calculated based only on the values of the second order partial derivative matrix, or an evaluation value of the likelihood of being a line-like structure and an evaluation value of the likelihood of being a plate-like structure for the pixel position calculated with reducing influence of the first order partial derivative value.

A first aspect of the image processing method according to the invention includes:

calculating a second order partial derivative matrix and at least one first order partial derivative value of a pixel value at each pixel position in an image, and calculating an evaluation value of a likelihood of being a line-like structure and/or an evaluation value of a likelihood of being a plate-like structure for the pixel position based on values of the second order partial derivative matrix, wherein the larger the first order partial derivative value, the smaller the evaluation values.

A second aspect of the image processing device according to the invention includes:

derivative value calculating means for calculating a second order partial derivative matrix and at least one first order partial derivative value of a pixel value at each pixel position in an image; and evaluating means for calculating an evaluation value of a likelihood of being a line-like structure at the pixel position based on values of the second order partial derivative matrix, wherein the evaluating means changes the evaluation value based on a magnitude of the first order partial derivative value.

In the second aspect of the image processing device according to the invention, the evaluating means may correct each of the values of the second order partial derivative matrix depending on a magnitude of the first order partial derivative value that coincides with a second order partial derivative direction of each of the values of the second order partial derivative matrix, and calculate the evaluation value based on the corrected values of the second order partial derivative matrix.

In the second aspect of the image processing device according to the invention, the derivative value calculating means may calculate the second order partial derivative matrix and the first order partial derivative value with using filters having different sizes, and the filter used to calculate the first order partial derivative value may have a size larger than a size of the filter used to calculate the second order partial derivative matrix.

In the second aspect of the image processing device according to the invention, the derivative value calculating means may apply multi-resolution conversion to the image to obtain resolution images having different resolutions, and calculate the second order partial derivative matrix and the first order partial derivative value with using a filter having a predetermined size at each corresponding pixel position of the resolution images, and the resolution image used to calculate the first order partial derivative value may have a resolution lower than a resolution of the resolution image used to calculate the second order partial derivative matrix.

In the second aspect of the image processing device according to the invention, the derivative value calculating means may calculate the second order partial derivative matrix and the first order partial derivative value using a one-dimensional basic Gaussian kernel, a first order derivative kernel obtained through first order differentiation of the basic Gaussian kernel and a second order derivative kernel obtained through second order differentiation of the basic Gaussian kernel.

The second aspect of the image processing device according to the invention may further include segmenting means for segmenting the object area and the background area by setting a likelihood of belonging to an object area, a likelihood of belonging to a background area, and a likelihood of adjacent pixels belonging to the same area for each pixel of the image based on the evaluation values.

In this case, the segmenting means may set the likelihood of belonging to an object area based on the evaluation value of the likelihood of being a line-like structure.

Further, the segmenting means may set the likelihood of belonging to the same area based on an evaluation value of the likelihood of being a line-like structure at the pixel position calculated based only on the values of the second order partial derivative matrix, or based on an evaluation value of the likelihood of being a line-like structure calculated with reducing influence of the first order partial derivative value.

A second aspect of the image processing method according to the invention includes:

calculating a second order partial derivative matrix and at least one first order partial derivative value of a pixel value at each pixel position in an image; and calculating an evaluation value of a likelihood of being a line-like structure at the pixel position based on values of the second order partial derivative matrix, wherein the evaluation value is changed based on a magnitude of the first order partial derivative value.

The image processing method according to the invention may be provided in the form of a program for causing a computer to carry out the first and/or second aspect of the image processing method.

In the cases of erroneous extraction of a bone structure during discrimination of the line-like structure, such as a blood vessel, contained in a medical image using the Hessian matrix, and erroneous extraction of a blood vessel during discrimination of the plate-like structure, such as a cortical bone, contained in a medical image, there is a one-dimensional bias in a pattern of luminance values at an erroneously extracted area. For example, in the case of erroneous extraction shown in FIG. 8, it can be understood that there is such a one-dimensional bias that the luminance values are higher at the area inside the blood vessel and are lower at the area outside the blood vessel. With such a one-dimensional bias present in the pattern of the luminance values, the first order partial derivative value becomes large. In contrast, an ideal line-like structure and an ideal plate-like structure are symmetrical about the center thereof, and therefore the first order partial derivative values are 0. According to the first aspect of the invention, the second order partial derivative matrix and the first order partial derivative value of a pixel value at an arbitrary pixel position in an image are calculated, and an evaluation value of a likelihood of being a line-like structure and/or an evaluation value of a likelihood of being a plate-like structure are calculated for the pixel position based on values of the second order partial derivative matrix, such that the larger the first order partial derivative value, the smaller the evaluation values outputted by the evaluating means. Thus, erroneous discrimination of a line-like structure and a plate-like structure contained in an image is prevented, thereby achieving accurate discrimination of the line-like structure and the plate-like structure.

On the other hand, with respect to an ideal line-like structure, when eigenvalues in three directions are obtained by applying eigenvalue decomposition to the values of the second order partial derivative matrix, two eigenvalues in directions perpendicular to the major axis of a tissue formed by a line-like structure are substantially equal to each other. However, as in the case of a coronary artery running along the periphery of a heart, for example, when a line-like structure is present in the vicinity of a plate-like structure, an eigenvalue in a direction from the line-like structure to the plate-like structure (a direction normal to the plate-like structure) becomes large. Therefore, a low evaluation value with respect to the likelihood of being a line-like structure is provided, and this may result in unsuccessful determination of the line-like structure. According to the second aspect of the image processing device and method of the invention, the second order partial derivative matrix and the first order partial derivative value of a pixel value at an arbitrary pixel position in an image are calculated, and an evaluation value of a likelihood of being a line-like structure at the pixel position is calculated based on values of the second order partial derivative matrix, where the evaluation value is changed based on a magnitude of the first order partial derivative value. In particular, the values of the second order partial derivative matrix are corrected depending on a magnitude of the first order partial derivative value that coincides with a second order partial derivative direction of each of the values of the second order partial derivative matrix, and the evaluation value is calculated based on the corrected values of the second order partial derivative matrix. Thus, even when a line-like structure is present in the vicinity of a plate-like structure, substantially equal values of the second order partial derivative matrix in a direction along which the plate-like structure is present and in a direction perpendicular to this direction can be provided. This can prevent lowering of the evaluation value with respect to the likelihood of being a line-like structure, thereby achieving accurate discrimination of the line-like structure.

Further, in the case where the second order partial derivative matrix and the first order partial derivative value are calculated with using filters having different sizes, the filter used to calculate the first order partial derivative value has a size larger than a size of the filter used to calculate the second order partial derivative matrix, or in the case where resolution images having different resolutions are obtained by applying multi-resolution conversion to the image and the second order partial derivative matrix and the first order partial derivative value are calculated with using a filter having a predetermined size at each corresponding pixel position of the resolution images, the resolution image used to calculate the first order partial derivative value has a resolution lower than a resolution of the resolution image used to calculate the second order partial derivative matrix. This makes it easier to capture the one-dimensional bias of the luminance values, thereby allowing more accurate calculation of the evaluation values of the likelihood of being a line-like structure and the likelihood of being a plate-like structure.

Still further, in the case where the second order partial derivative matrix and the first order partial derivative value are calculated using a one-dimensional basic Gaussian kernel, a first order derivative kernel obtained through first order differentiation of the basic Gaussian kernel and a second order derivative kernel obtained through second order differentiation of the basic Gaussian kernel, calculation of the second order partial derivative matrix and the first order partial derivative value can be achieved by a relatively simple operation, thereby improving the operation speed.

Yet further, in the case where the object area and the background area are segmented with setting a likelihood of belonging to an object area, a likelihood of belonging to a background area and a likelihood of adjacent pixels belonging to the same area for each pixel of the image based on the evaluation values, accurate segmentation of the object area and the background area can be achieved.

In particular, by setting the likelihood of belonging to an object area based on the evaluation value of the likelihood of being a line-like structure, and setting the likelihood of belonging to a background area based on the evaluation value of the likelihood of being a plate-like structure, accurate segmentation of the line-like structure, such as a blood vessel, and the plate-like structure, such as a bone, in the image can be achieved.

BRIEF DESCRIPTION OF THE DRAWINGS

FIG. 1 is a schematic block diagram illustrating the configuration of an image processing device according to an embodiment of the invention, FIG. 2 is a diagram for explaining multi-resolution conversion.

DESCRIPTION OF THE PREFERRED EMBODIMENTS

Figure 3:
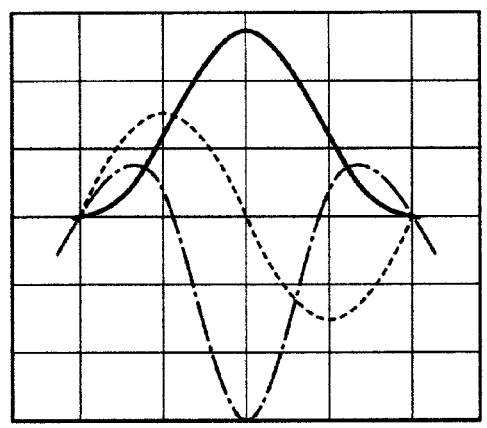
FIG. 3 is a diagram illustrating a Gaussian kernel.

Hereinafter, an embodiment of the present invention will be described with reference to the drawings. FIG. 1 is a schematic block diagram illustrating the configuration of an image processing device according to the embodiment of the invention. It should be noted that the configuration of the image processing device 1, as shown in FIG. 1, is implemented by executing on a computer (such as a personal computer) a program, which has been loaded in an auxiliary storage device (not shown) of the computer. The program may be distributed with being stored in an information storage medium, such as a CD-ROM, or over a network, such as the Internet, to be installed on the computer.

The image processing device 1 generates a three-dimensional image M0 using a number of two-dimensional images taken with an X-ray CT apparatus 2, for example, and automatically segments a line-like structure or a plate-like structure contained in the three-dimensional image M0. The image processing device 1 includes an image obtaining unit 10, a detection area setting unit 20, a discrimination unit 30, a segmentation unit 40, a display unit 50 and an input unit 60.

The image obtaining unit 10 obtains a number of CT images (two-dimensional images) taken with the X-ray CT apparatus 2, for example, and generates the three-dimensional image M0 from the two-dimensional images. It should be noted that the image obtaining unit 10 is not limited to the device that obtains CT images, and may be any of devices that obtain two-dimensional images, such as so-called MRI images, RI images, PET images or X-ray images.

The detection area setting unit 20 first converts the voxel size of the three-dimensional image M0 into an isotropic voxel size. For example, if the voxel size of the three-dimensional image M0 is 0.3 mm×0.3 mm×0.6 mm in the X-, Y- and Z-directions of the three-dimensional image M0, the voxel size of the three-dimensional image M0 is converted into an isotropic voxel size of (X, Y, Z)=(0.5, 0.5, 0.5) (mm). Converting the voxel size of the three-dimensional image M0 into an isotropic voxel size in this manner allows the discrimination unit 30 to apply a kernel of the same size in X-, Y- and Z-directions, as will be described later, thereby simplifying the operation.

After the conversion of the three-dimensional image M0 into the isotropic voxel size, the detection area setting unit 20 applies multi-resolution conversion to the three-dimensional image M0 to generate three-dimensional multi-resolution images Msi (i=0 to n) having different resolutions (Gaussian pyramid), as shown in FIG. 2. It should be noted that "i=0" indicates the image has the same resolution as the resolution of the three-dimensional image M0, and "i=n" indicates that the image has the lowest resolution. The voxel sizes of the three-dimensional multi-resolution images Msi are: (X, Y, Z)=(0.5, 0.5, 0.5), (1.0, 1.0, 1.0), (2.0, 2.0, 2.0), and so on, in the order from the highest resolution.

The discrimination unit 30 includes a filtering unit 32 and an evaluation unit 34. The filtering unit 32 performs filtering using a Gaussian kernel to each of the three-dimensional multi-resolution images Msi for carrying out Hessian analysis using a Hessian matrix. That is, a filter kernel of the same size ($\sigma$=1.0) is convolved for each of the three-dimensional multi-resolution images Msi having different resolutions. This is substantially equivalent to applying filter kernels having different sizes to the three-dimensional image M0, and allows detection of line-like structures (for example, a blood vessel) and plate-like structures (for example, a bone, such as a cortical bone) having different sizes.

Now, the Hessian analysis is described. A Hessian matrix used in the Hessian analysis is a 3×3 matrix for a three-dimensional image, as shown by expression (1) below:

$$\nabla^2 I = \begin{bmatrix} I_{xx} & I_{xy} & I_{xz} \\ I_{yx} & I_{yy} & I_{yz} \\ I_{zx} & I_{zy} & I_{zz} \end{bmatrix} \quad (1)$$

$$I_{xx} = \frac{\partial^2 I}{\partial x^2},$$

$$I_{xy} = \frac{\partial^2 I}{\psi x \partial y},$$

Further, when a Gaussian kernel function f is used, filter coefficients for obtaining the Hessian matrix are found using a one-dimensional basic kernel, a first order derivative kernel obtained through first order differentiation of the basic kernel, and a second order derivative kernel obtained through second order differentiation of the basic kernel, as shown by expression (2) below:

$$\left. \begin{array}{l} f = \exp\left(-\frac{x^2}{2\sigma^2}\right) \\ \frac{\partial f}{\partial x} = \left(-\frac{x}{\sigma^2}\right) \times f \\ \frac{\partial^2 f}{\partial x^2} = \left(\frac{x^2}{\sigma^4} - \frac{1}{\sigma^2}\right) \times f \end{array} \right\} \quad (2)$$

It should be noted that expression (2) shows only the filter coefficients for the X-direction. For each of the Y-direction and the Z-direction, the basic kernel, the first order derivative kernel and the second order derivative kernel can be found in the same manner. If the basic kernel is one shown by the solid line in FIG. 3, the first order derivative kernel is one shown by the dashed line in FIG. 3, and the second order derivative kernel is one shown by the dashed-dotted line in FIG. 3.

For example, the element Ixx, which is a second order partial derivative value in the Hessian matrix, can be calculated by convolving the second order derivative kernel in the X-direction, and convolving the basic kernel in each of the Y-direction and Z-direction for each pixel to be processed of the three-dimensional multi-resolution images Msi, i.e., by filtering the pixels to be processed of the three-dimensional multi-resolution images Msi. Further, the element Ixy in the Hessian matrix can be calculated by convolving the first order derivative kernel in each of the X-direction and Y-direction, and convolving the basic kernel in the Z-direction for each pixel to be processed.

Figure 4:
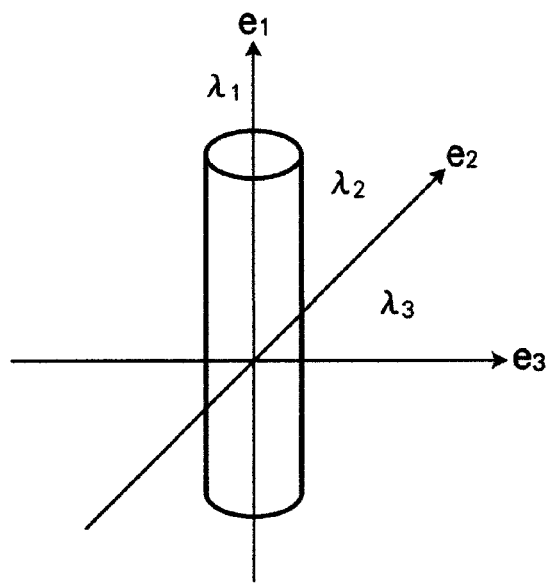
FIG. 4 is a diagram for explaining eigenvalues of a line-like structure.

It is known that, when eigenvalue decomposition is applied to the thus calculated Hessian matrix to provide eigenvalues, eigenvalues of the line-like structure have such characteristics, as shown in FIG. 4, that two of the three eigenvalues have large values and one is near 0. For example, eigenvalues with respect to expression (1) has relationships shown by expression (3) below with respect to an object tissue formed by the line-like structure:

Eigenvalues of $\nabla^2 I : \lambda_1, \lambda_2, \lambda_3$ $\lambda_1 \approx 0$ $\lambda_2, \lambda_3 >> 0$ $\lambda_2 \approx \lambda_3$ (3)

Figure 5:
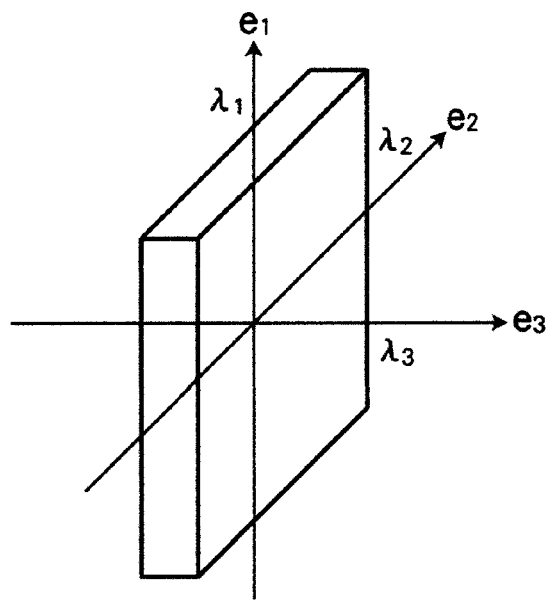
FIG. 5 is a diagram for explaining eigenvalues of a plate-like structure.

Further, it is known that eigenvalues of the plate-like structure have such characteristics, as shown in FIG. 5, that one of the three eigenvalues has a large value and two are near 0. For example, eigenvalues with respect to expression (1) has relationships shown by expression (4) below with respect to an object tissue formed by the plate-like structure:

$\lambda_1 0, \lambda_2 0$ $\lambda_3 >> 0$ (4)

It should be noted that, in FIGS. 4 and 5, e1, e2 and e3 represent directions of eigenvectors of the eigenvalues $\lambda 1, \lambda 2$ and $\lambda 3$.

Therefore, a likelihood of being a line-like structure and a likelihood of being a plate-like structure can be determined from the eigenvalues, and the result of the determination is used to segment a blood vessel region, which is a line-like structure, and a bone region, which is a plate-like structure, in the three-dimensional image M0.

The filtering unit 32 first calculates a first order partial derivative value for each of the X-, Y- and Z-directions for each pixel of the three-dimensional multi-resolution images Msi. The first order partial derivative value in the X-direction is calculated by convolving the first order derivative kernel in the X-direction and convolving the basic kernel in each of the Y-direction and Z-direction for each pixel of the three-dimensional multi-resolution images Msi. The first order partial derivative value in the Y-direction is calculated by convolving the first order derivative kernel in the Y-direction and convolving the basic kernel in each of the X-direction and Z-direction for each pixel of the three-dimensional multi-resolution images Msi. The first order partial derivative value in the Z-direction is calculated by convolving the first order derivative kernel in the Z-direction and convolving the basic kernel in each of the X-direction and Y-direction for each pixel of the three-dimensional multi-resolution images Msi. The thus calculated first order partial derivative values in the X-direction, Y-direction and Z-direction are assumed to be ρx, ρy and ρz, respectively.

Further, the filtering unit 32 calculates the elements of the Hessian matrix by calculating the second order partial derivative values for each of the X-, Y- and Z-directions for each pixel of the three-dimensional multi-resolution images Msi. As described above, the element Ixx in the Hessian matrix is calculated by convolving the second order derivative kernel in the X-direction and convolving the basic kernel in each of the Y-direction and Z-direction for each pixel of the three-dimensional multi-resolution images Msi. The element Ixy in the Hessian matrix is calculated by convolving the first order derivative kernel in each of the X-direction and Y-direction and convolving the basic kernel in the Z-direction for each pixel of the three-dimensional multi-resolution images Msi.

The evaluation unit 34 applies eigenvalue decomposition to the Hessian matrix calculated by the filtering unit 32 to calculate the three eigenvalues λ1, λ2 and λ3. The eigenvalue λ1, λ2 and λ3 are assumed to satisfy the following relationship: |λ1|≦|λ2|≦|λ3|. Then, an evaluation value L0 (Lineness) with respect to the likelihood of being a line-like structure and an evaluation value P0 (Planeness) with respect to the likelihood of being a plate-like structure are calculated for each pixel of the three-dimensional multi-resolution images Msi, as shown by expressions (5) and (6) below:

$$L0(\text{Lineness}) = \left(1 - \exp\left(-\frac{R_A^2}{2a^2}\right)\right)\exp\left(-\frac{R_B^2}{2b^2}\right)\left(1 - \exp\left(-\frac{S_{2nd}^2}{2c^2}\right)\right)\exp\left(-\frac{S_{1st}^2}{2d^2}\right) \quad (5)$$

$$P0(\text{Planeness}) = \exp\left(-\frac{R_A^2}{2e^2}\right)\exp\left(-\frac{R_C^2}{2f^2}\right)\left(1 - \exp\left(-\frac{S_{2nd}^2}{2g^2}\right)\right)\exp\left(-\frac{S_{1st}^2}{2h^2}\right) \quad (6)$$

The symbols "a" to "h" in expressions (5) and (6) are constants. Further, $R_A$, $R_B$ and $R_C$ are calculated according to expressions (7) to (9) below:

$$R_A = \frac{|\lambda_2|}{|\lambda_3|}, \quad (7)$$

$$R_B = \frac{|\lambda_1|}{\sqrt{\lambda_2 \lambda_3}}, \quad (8)$$

$$R_C = \frac{\sqrt{\lambda_1 \lambda_2}}{|\lambda_3|}, \quad (9)$$

$S_{2nd}$ and $S_{1st}$ are powers of the second order partial derivative values and the first order partial derivative values, and are calculated according to expressions (10) and (11) below:

$$S_{2nd} = \sqrt{\lambda_1^2 + \lambda_2^2 + \lambda_3^2}, \quad (10)$$

$$S_{1st} = \sqrt{\rho_x^2 + \rho_y^2 + \rho_z^2}, \quad (11)$$

As the first order partial derivative values ρx, ρy and ρz used in expressions (5) and (6), values calculated using a larger filter size, i.e., one of the three-dimensional multi-resolution images Msi having a lower resolution, than that used for calculating the second order partial derivative values are used. Specifically, the first order partial derivative values ρx, ρy and ρz are calculated using one of the three-dimensional multi-resolution images Msi having a resolution lower by about one level in the Gaussian pyramid. This makes it easier to capture the one-dimensional bias of the luminance values of the three-dimensional multi-resolution images Msi, thereby allowing more accurate calculation of the evaluation values L0 and P0 of the likelihood of being a line-like structure and the likelihood of being a plate-like structure.

In the cases of erroneous extraction of a bone structure during discrimination of the line-like structure, such as a blood vessel, contained in a medical image using the Hessian matrix, and erroneous extraction of a blood vessel during discrimination of the plate-like structure, such as a cortical bone, contained in a medical image, there is a one-dimensional bias in a pattern of luminance values of the erroneously extracted area. With such a one-dimensional bias present in the pattern of the luminance values, the first order partial derivative values become large. In contrast, an ideal line-like structure and an ideal plate-like structure are symmetrical about the center thereof, and therefore the first order partial derivative values are 0. Therefore, when the first order partial derivative values are large, i.e., the power $S_{1st}$ is large, the likelihood of being a line-like structure and the likelihood of being a plate-like structure are small. Therefore, the smaller the values of the last terms $\exp(-S_{1st}/2d^2)$ and $\exp(-S_{1st}/2h^2)$ in expressions (5) and (6), the smaller the evaluation values L0 and P0 with respect to the likelihood of being a line-like structure and the likelihood of being a plate-like structure.

In this embodiment, for each of the multi-resolution three-dimensional images Msi having different resolutions, the evaluation value L0 of the likelihood of being a line-like structure and the evaluation value P0 of the likelihood of being a plate-like structure are calculated. The thus calculated evaluation values L0 and P0 are used as evaluation values for the corresponding pixel position of the original three-dimensional image M0. Each evaluation values is calculated for the corresponding pixel position of each multi-resolution three-dimensional image Msi, and, in this embodiment, the highest evaluation value of the evaluation values calculated for the corresponding pixel position of the three-dimensional images Msi is used as the evaluation value for the pixel position of the original three-dimensional image M0.

Based on the evaluation value L0 of the likelihood of being a line-like structure and the evaluation value P0 of the likelihood of being a plate-like structure calculated by the discrimination unit 30, the segmentation unit 40 carries out area segmentation of a blood vessel region and an area other than the blood vessel, which includes a bone, of the three-dimensional image M0. Specifically, with setting the blood vessel region as an object area and the area other than the blood vessel region as a background area, the segmentation unit 40 sets a discrimination area having a predetermined pixel size for each pixel position of the three-dimensional image M0, and segments the discrimination area into the object area and the background area using a Graph Cut area segmentation method. The Graph Cut area segmentation method is described in Y. Y. Boykov and M. P. Jolly, "Interactive Graph Cuts for Optimal Boundary & Region Segmentation of Objects in N-D images", Proceedings of "International Conference on Computer Vision", vol. I, pp. 105-112, 2001.

Figure 6:
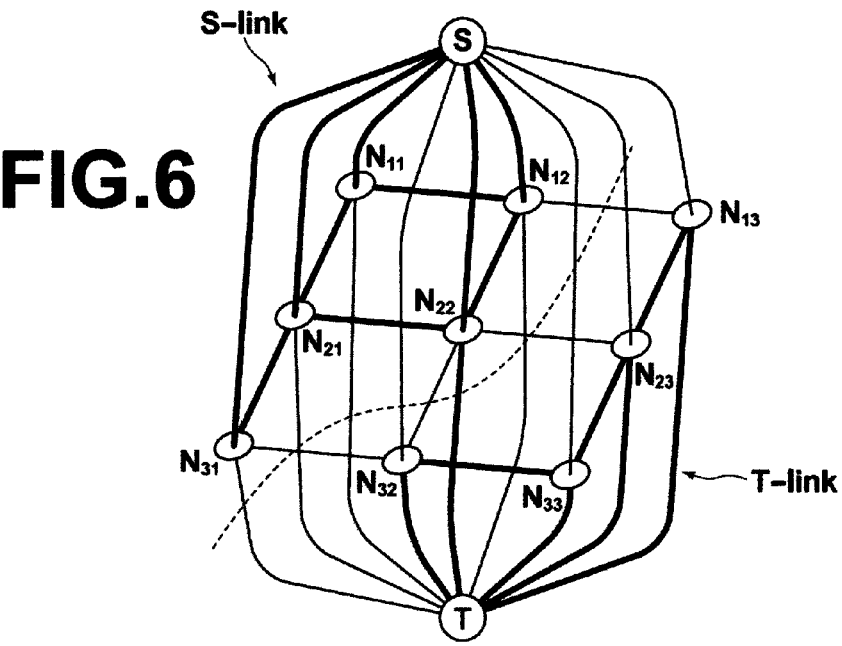
FIG. 6 is a diagram for explaining a Graph Cut area segmentation method.

In the Graph Cut area segmentation method, first, a graph as shown in FIG. 6 is generated, which includes nodes Nij representing individual pixels in the discrimination area, a node S representing the object area (the blood vessel region), a node T representing the background area, N-links each representing a likelihood of each pair of nodes of adjacent pixels belonging to the same area, S-links connecting the individual nodes Nij representing the individual pixels to the node S representing the object area, and T-links connecting the individual nodes Nij to the node T representing the background area. In FIG. 6, the discrimination area is shown as a 3×3 two-dimensional area for ease of explanation.

Each S-link connecting each node Nij representing each pixel to the node S representing the object area indicates a likelihood of each pixel being a pixel belonging to the object area with the thickness of the link (the magnitude of the value). Each T-link connecting each node Nij representing each pixel to the node T representing the background area indicates a likelihood of each pixel being a pixel belonging to the background area with the thickness of the link (the magnitude of the value). A larger value of the S-link is set (a thicker link is provided) for a larger evaluation value L0 of the likelihood of being a line-like structure calculated by the discrimination unit 30. Similarly, a larger value of the T-link is set (a thicker link is provided) for a larger evaluation value P0 of the likelihood of being a plate-like structure calculated by the discrimination unit 30. In this embodiment, smaller values of the last terms $\exp(-S_{1st}/2d^2)$ and $\exp(-S_{1st}/2h^2)$ in expressions (5) and (6) provide smaller evaluation values L0 and P0 with respect to the likelihood of being a line-like structure and the likelihood of being a plate-like structure, and the T-link representing the object area and the S-link representing the background area do not become thick.

The values of the S-link and the T-link may be set using the luminance value of each pixel, in addition to the evaluation values L0 and P0, according to expressions (12) and (13) below:

$$S\text{-link}=g1(L0)\times g2(I) \qquad (12)$$

$$T\text{-link}=g3(P0)\times g4(I) \qquad (13)$$

In expression (12), "g1( )" is a function that outputs a larger value for a larger evaluation value L0 of the likelihood of being a line-like structure, and "g2( )" is a function that outputs a larger value of the S-link for a luminance value (CT value) I of each pixel of the three-dimensional image M0 which is statistically nearer to a luminance value of the blood vessel. In expression (13), "g3( )" is a function that outputs a larger value for a larger evaluation value P0 of the likelihood of being a plate-like structure, and "g4( )" is a function that outputs a larger value of the T-link for a luminance value I of each pixel of the three-dimensional image M0 which is statistically nearer to a luminance value of the bone.

Each N-link represents the likelihood of each pair of adjacent pixels belonging to the same area with the thickness of the link (the magnitude of the value). A larger value of the N-link is set for a larger evaluation value L0' of the likelihood of being a line-like structure, which is calculated according to an expression similar to expression (5), from which the last term $\exp(-S_{1st}/2d^2)$ in expression (5) is removed. The evaluation value L0' may be calculated with decreasing the weight of the last term $\exp(-S_{1st}/2d^2)$ in expression (5). In the example shown in FIG. 6, the fact that all the pixels representing the blood vessel region, which is the object area in this embodiment, belong to the same area is reflected by the N-links. Therefore, the entire blood vessel region can be segmented from the other areas in the three-dimensional image M0 according to the S-link set in the blood vessel region. In particular, in the case of a noisy image, there are large luminance differences even among pixels in the blood vessel region. This results in low degree of similarity of the pixels in the blood vessel region, and thus results in thin N-links. However, by using the evaluation value (Lineness) of the likelihood of being a line-like structure obtained according to the expression similar to expression (5), from which the last term $\exp(-S_{1st}/2d^2)$ in expression (5) is removed, the values of the N-links can be increased.

It should be noted that, the value of the N-link may also be set using luminance values of two pixels connected by the N-link, in addition to the evaluation value L0', according to expression (14) below:

$$N\text{-link}=g5(L0')\times g6((I1+I2)/2)\times g7(I1-I2) \qquad (14)$$

In expression (14), "g5( )" is a function that outputs a larger value for a larger evaluation value L0', "g6( )" is a function that outputs a larger value of the N-link for an average of the luminance values I1 and I2 of the two pixels which is statistically nearer to an average of the luminance value of the blood vessel and the luminance value of the bone, and "g7( )" is a function that outputs a larger value of the N-link for a smaller difference between the luminance values I1 and I2 of the two pixels.

In the example shown in FIG. 6, pixels represented by the nodes $N_{11}, N_{12}, N_{21}, N_{22}$ and $N_{31}$ have large evaluation values L0 of the likelihood of being a line-like structure, and therefore the nodes $N_{11}, N_{12}, N_{21}, N_{22}$ and $N_{31}$ are connected to the node S by the thick S-links. Further, the pixels represented by the nodes $N_{11}, N_{12}, N_{21}, N_{22}$ and $N_{31}$ have large evaluation values L0' of the likelihood of being a line-like structure, which is calculated according to the expression similar to expression (5), from which the last term $\exp(-S_{1st}/2d^2)$ in expression (5) is removed, and therefore each of the nodes $N_{11}, N_{12}, N_{21}, N_{22}$ and $N_{31}$ is connected to each adjacent node by the thick N-link. On the other hand, pixels represented by nodes $N_{13}, N_{23}, N_{32}$ and $N_{33}$ have large evaluation values P0 of the likelihood of being a plate-like structure, and therefore the nodes $N_{13}, N_{23}, N_{32}$ and $N_{33}$ are connected to the node T by the thick T-links.

Since the blood vessel region and the area other than the blood vessel, which includes the bone, are exclusive to each other, the discrimination area can be segmented into the object area and the background area by cutting appropriate links among the S-links, the T-links and the N-links to separate the node S from the node T, as shown by the dashed line in FIG. 6, for example. In this case, optimal area segmentation can be achieved by cutting the links such that the sum of the values of the S-links, T-links and N-links to be cut is minimized.

The display unit 50 is a monitor, such as a CRT screen, for displaying a two-dimensional image or a three-dimensional image. In this embodiment, the display unit 50 carries out volume-rendered display of the line-like structure, which is segmented as the object area, and the plate-like structure to provide an overview of the entire line-like structure and plate-like structure and visualize the continuity thereof.

The input unit 60 includes a keyboard and a mouse, for example.

Figure 7:
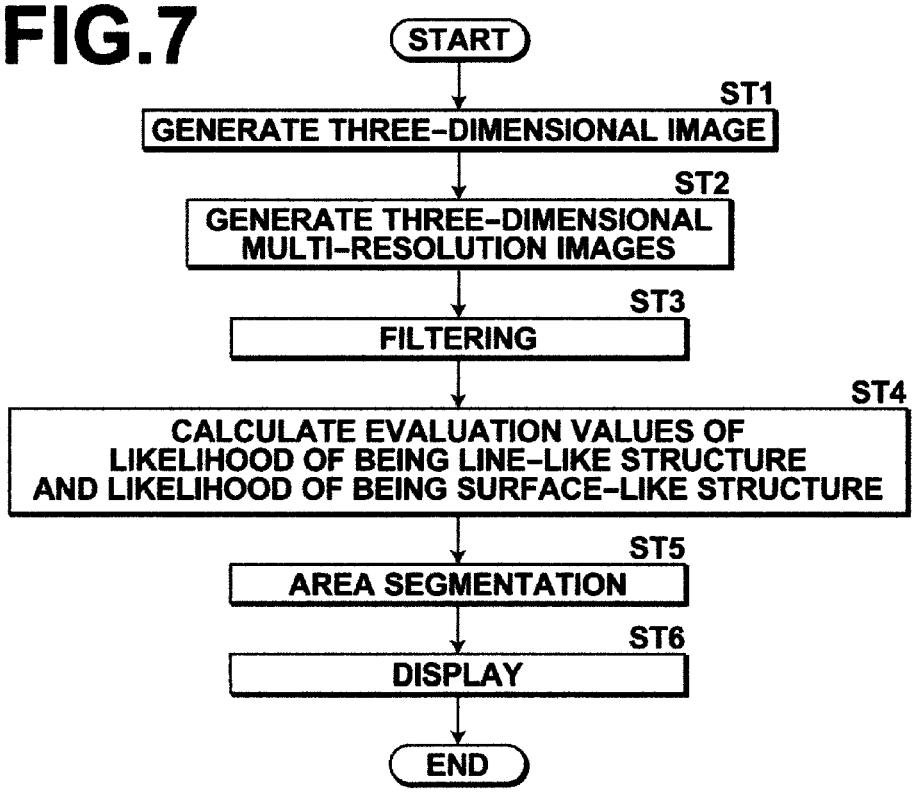
FIG. 7 is a flow chart illustrating a process carried out in an embodiment of the invention.
Figure 8:
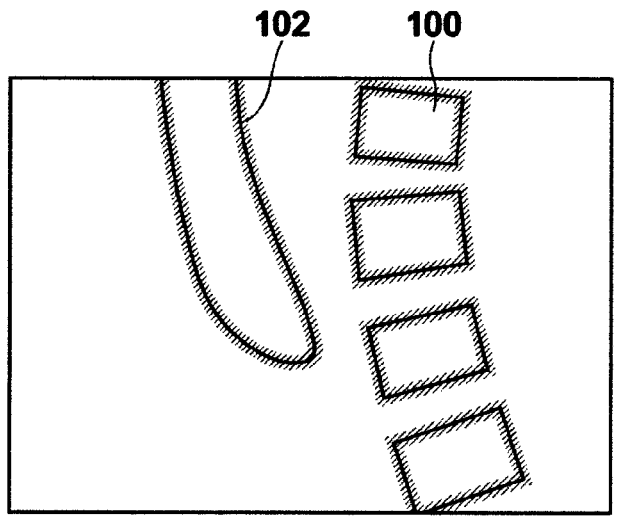
FIG. 8 is diagram for explaining erroneous detection of a plate-like structure.
Figure 9:
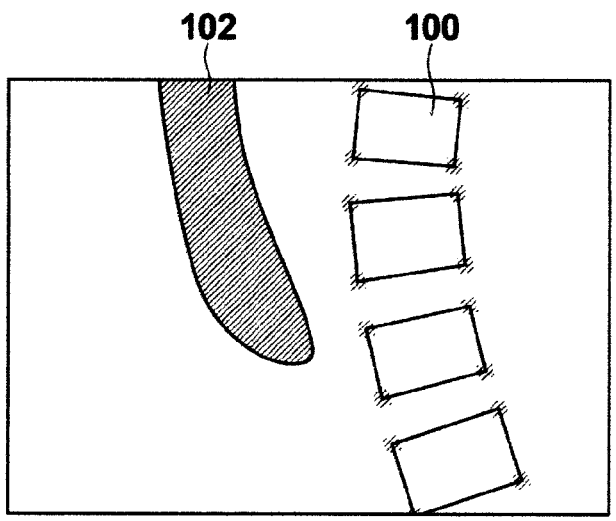
FIG. 9 is a diagram for explaining erroneous detection of a line-like structure.

Next, a process carried out in this embodiment is described. FIG. 7 is a flow chart illustrating the process carried out in this embodiment. First, the image obtaining unit 10 generates the three-dimensional image M0 from two-dimensional images taken with the X-ray CT apparatus 2 (step ST1). Then, the detection area setting unit 20 converts the size of the three-dimensional image M0 into an isotropic voxel size and applies multi-resolution conversion to the converted three-dimensional image M0 to generate the three-dimensional multi-resolution images Msi having different resolutions (step ST2).

Subsequently, the filtering unit 32 of the discrimination unit 30 filters each three-dimensional multi-resolution image Msi using the Gaussian kernel to calculate the first order partial derivative values and the second order partial derivative matrix for each pixel position (step ST3). Then, the evaluation unit 34 calculates the evaluation value L0 of the likelihood of being a line-like structure and the evaluation value P0 of the likelihood of being a plate-like structure (step ST4).

Then, the segmentation unit 40 segments the three-dimensional image M0 into the object area (the blood vessel region) and the background area using the above-described Graph Cut area segmentation method (step ST5). Finally, the display unit 50 carries out volume-rendered display of the segmented object area and the background area (step ST6), and the process ends.

As described above, in this embodiment, the second order partial derivative matrix and the first order partial derivative value of a pixel value at each pixel position of the three-dimensional image M0 are calculated, and the evaluation values L0 and P0 with respect to the likelihood of being a line-like structure and the likelihood of being a plate-like structure for the pixel position are calculated based on the eigenvalues of the second order partial derivative matrix, such that the larger the first order partial derivative values, the smaller the evaluation values L0 and P0. That is, the larger the difference of the shape from an ideal line-like structure or an ideal plate-like structure, the smaller the evaluation value L0 or P0. Thus, according to this embodiment, erroneous discrimination of the line-like structure and the plate-like structure contained in the three-dimensional image M0 can be prevented to achieve accurate discrimination of the line-like structure, such as a blood vessel, and the plate-like structure, such as a bone, contained in the three-dimensional image M0.

Since the first order partial derivative values are calculated using the first order derivative kernel, which is necessarily calculated when the second order partial derivative matrix is calculated, the invention requires no increase of the amount of operation when compared to the case where conventional Hessian analysis is carried out.

Further, by carrying out segmentation of the three-dimensional image M0 into the object area and the background area with setting, for each pixel of the three-dimensional image M0, the S-link indicating the likelihood of the pixel belonging to an object area, the T-link indicating the likelihood of the pixel belonging to a background area, and the N-link indicating the likelihood of each pair of adjacent pixels belonging to the same area based on the evaluation values L0 and P0, accurate segmentation of the object area and the background area can be achieved.

It should be noted that, although the invention is applied to discrimination of the line-like structure and the plate-like structure contained in the three-dimensional image M0 in the above-described embodiment, the invention is also applicable to discrimination of the line-like structure and the plate-like structure contained in a two-dimensional image.

Further, although the blood vessel is discriminated as the line-like structure in the above-described embodiment as an example, the invention is also applicable to discrimination of other line-like structures, such as bronchial tubes. Also, the invention is applicable to discrimination of other plate-like structures, such as skin, interlobar pleura, etc., besides the bone.

Still further, although the Graph Cut area segmentation method is used to achieve the segmentation of the line-like structure and the plate-like structure contained in the three-dimensional image M0 in the above-described embodiment, the segmentation may be achieved using any other area segmentation technique, such as a Watershed algorithm. The Watershed algorithm is a technique to segment an image in such a manner that, as water is poured on a topography which regards the pixel value information of the image as altitude, boundaries are formed between water pools formed in different depressions. In this case, segmentation of the line-like structure and the plate-like structure can be achieved by applying appropriate smoothing to the evaluation values L0 and P0 of the three-dimensional image M0 before the Watershed algorithm is executed.

In the above-described embodiment, the line-like structures and the plate-like structures having various sizes are discriminated by applying the multi-resolution conversion to the three-dimensional image M0 to generate the three-dimensional multi-resolution images Msi, and calculating the first order partial derivative values and the second order partial derivative matrix using a filter having a single size. However, filters having different sizes may be applied to the three-dimensional image M0 to calculate the first order partial derivative values and the second order partial derivative matrix.

Further, although both the evaluation value L0 of the likelihood of being a line-like structure and the evaluation value P0 of the likelihood of being a plate-like structure are calculated in the above-described embodiment, only one of the evaluation value L0 of the likelihood of being a line-like structure and the evaluation value P0 of the likelihood of being a plate-like structure may be calculated.

Yet further, although the eigenvalues which are obtained by applying eigenvalue decomposition to the Hessian matrix are used to calculate the evaluation value L0 of the likelihood of being a line-like structure and the evaluation value P0 of the likelihood of being a plate-like structure in the above-described embodiment, the evaluation values of the likelihood of being a line-like structure and the likelihood of being a plate-like structure may be calculated using the elements of the Hessian matrix without obtaining the eigenvalues.

Figure 10:
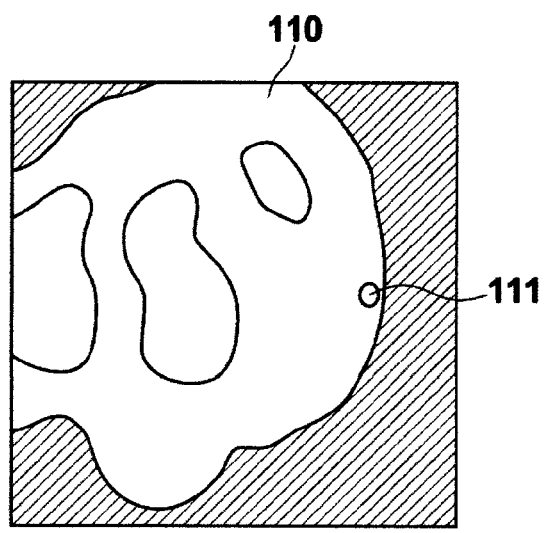
FIG. 10 is a diagram for explaining erroneous detection of a line-like structure in the case where the line-like structure is present in the vicinity of a plate-like structure.

With respect to an ideal line-like structure, when three eigenvalues $\lambda 1$, $\lambda 2$ and $\lambda 3$ are obtained by applying eigenvalue decomposition to the above-described Hessian matrix, two eigenvalues $\lambda 2$ and $\lambda 3$ in directions perpendicular to the direction along which the line-like structure extends are substantially equal to each other, as shown by expression (3) above. However, as in the case of a coronary artery 111 running along the periphery of a heart 110, as shown in FIG. 10, for example, when a line-like structure (the coronary artery 111) is present in the vicinity of a plate-like structure (the wall surface of the heart 110), an eigenvalue in a direction from the line-like structure to the plate-like structure, i.e., a direction normal to the plate-like structure becomes large. For example, if a direction normal to the plate-like structure (the wall surface of the heart 110) coincides with the direction of the eigenvector e3, the eigenvalue $\lambda 3$ in this direction becomes larger than the eigenvalue $\lambda 2$ in a direction perpendicular to this direction. This is because that there is a large difference between CT values inside and outside the heart due to the presence of the lungs outside the heart. Therefore, a low evaluation value L0 with respect to the likelihood of being a line-like structure is provided, and this may result in unsuccessful determination of the line-like structure.

Now, a technique to solve this problem is described as a second embodiment of the invention. Since directions of the first order partial derivative values $\rho x$, $\rho y$ and $\rho z$ in the X-direction, Y-direction and Z-direction, which are calculated in the manner as described above, are not the same as directions of the eigenvectors e1, e2 and e3 of the eigenvalues $\lambda 1$, $\lambda 2$ and $\lambda 3$, the evaluation unit 34 in the second embodiment calculates first order partial derivative values $\rho 1$, $\rho 2$ and $\rho 3$ corresponding to the directions of the eigenvectors e1, e2 and e3, according to expression (15) below:

$$\rho_1 = \rho_x \times x_1 + \rho_y \times y_1 + \rho_z \times z_1$$

$$\rho_2 = \rho_x \times x_2 + \rho_y \times y_2 + \rho_z \times z_2$$

$$\rho_3 = \rho_x \times x_3 + \rho_y \times y_3 + \rho_z \times z_3 \tag{15}$$

Assuming that the eigenvalue $\lambda 3$ is larger between the eigenvalues $\lambda 2$ and $\lambda 3$, the evaluation unit 34 corrects the eigenvalue $\lambda 3$ according to expression (16) below. That is, the evaluation unit 34 corrects the eigenvalue $\lambda 3$ depending on magnitudes of the first order partial derivative values $\rho 2$ and $\rho 3$ in the directions of the eigenvectors e2 and e3 to obtain a corrected eigenvalue $\lambda 3'$.

$$\lambda 3' = \lambda 2 + (\lambda 3 - \lambda 2) \times f(|\rho 2 - \rho 3|) \tag{16}$$

In expression (16), f( ) is a function that outputs a value in the range from 0 to 1, where a smaller value is outputted for a larger value of |ρ2−ρ3|. Therefore, the larger the value of |ρ2−ρ3|, the nearer the value of the eigenvalue λ3' to the value of the eigenvalue λ2, and thus the relationship where the eigenvalue λ2 and the eigenvalue λ3 are substantially equal to each other shown in expression (3) is satisfied.

Then, the evaluation unit 34 uses the eigenvalue λ3' in place of the eigenvalue λ3 in expressions (7) to (9) for calculating the values of $R_A$, $R_B$ and $R_C$, and uses the thus calculated values $R_A$, $R_B$ and $R_C$ to calculate the evaluation value L0 with respect to the likelihood of being a line-like structure according to expression (5).

As described above, in the second embodiment, when the evaluation value L0 with respect to the likelihood of being a line-like structure is calculated, the eigenvalue λ3 is corrected depending on magnitudes of the first order partial derivative values ρ2 and ρ3, which coincide with the directions of the eigenvectors e2 and e3 of the eigenvalues λ2 and λ3, and the evaluation value L0 is calculated based on the corrected eigenvalue λ3'. Thus, even when a line-like structure is present in the vicinity of a plate-like structure, substantially equal eigenvalues λ2 and λ3 in a direction along which the plate-like structure is present and in a direction perpendicular to this direction can be provided. This can prevent lowering of the evaluation value L0 with respect to the likelihood of being a line-like structure, thereby achieving accurate discrimination of the line-like structure.

What is claimed is:

1. An image processing device comprising:
  derivative value calculating means for calculating a second order partial derivative matrix and at least one first order partial derivative value of a pixel value at each pixel position in an image; and
  an evaluation unit configured to calculate one or more of an evaluation value of a likelihood of being a line-like structure and an evaluation value of a likelihood of being a plate-like structure for the pixel position based on values of the second order partial derivative matrix, wherein the larger the first order partial derivative value, the smaller the evaluation values outputted by the evaluation unit.

2. The image processing device as claimed in claim 1, wherein the derivative value calculating means calculates the second order partial derivative matrix and the first order partial derivative value with using filters having different sizes, and wherein the filter used to calculate the first order partial derivative value has a size larger than a size of the filter used to calculate the second order partial derivative matrix.

3. The image processing device as claimed in claim 1, wherein the derivative value calculating means applies multi-resolution conversion to the image to obtain resolution images having different resolutions, and calculates the second order partial derivative matrix and the first order partial derivative value with using a filter having a predetermined size at each corresponding pixel position of the resolution images, and wherein the resolution image used to calculate the first order partial derivative value has a resolution lower than a resolution of the resolution image used to calculate the second order partial derivative matrix.

4. The image processing device as claimed in claim 1, wherein the derivative value calculating means calculates the second order partial derivative matrix and the first order partial derivative value using a one-dimensional basic Gaussian kernel, a first order derivative kernel obtained through first order differentiation of the basic Gaussian kernel and a second order derivative kernel obtained through second order differentiation of the basic Gaussian kernel.

5. The image processing device as claimed in claim 1, further comprising segmenting means for segmenting the object area and the background area by setting a likelihood of belonging to an object area, a likelihood of belonging to a background area, and a likelihood of adjacent pixels belonging to the same area for each pixel of the image based on the evaluation values.

6. The image processing device as claimed in claim 5, wherein the segmenting means sets the likelihood of belonging to an object area based on the evaluation value of the likelihood of being a line-like structure, and sets the likelihood of belonging to a background area based on the evaluation value of the likelihood of being a plate-like structure.

7. The image processing device as claimed in claim 5, wherein the segmenting means sets the likelihood of belonging to the same area based on an evaluation value of the likelihood of being a line-like structure and an evaluation value of the likelihood of being a plate-like structure for the pixel position calculated based only on the values of the second order partial derivative matrix, or an evaluation value of the likelihood of being a line-like structure and an evaluation value of the likelihood of being a plate-like structure for the pixel position calculated with reducing influence of the first order partial derivative value.

8. An image processing method comprising using a processor to perform the steps of:
  calculating a second order partial derivative matrix and at least one first order partial derivative value of a pixel value at each pixel position in an image; and
  calculating one or more of an evaluation value of a likelihood of being a line-like structure and an evaluation value of a likelihood of being a plate-like structure for the pixel position based on values of the second order partial derivative matrix, wherein the larger the first order partial derivative value, the smaller the evaluation values.

9. A computer-readable recording medium containing a program for causing a computer to carry out an image processing method comprising:
  calculating a second order partial derivative matrix and at least one first order partial derivative value of a pixel value at each pixel position in an image; and
  calculating an evaluation value of a likelihood of being a line-like structure and/or an evaluation value of a likelihood of being a plate-like structure for the pixel position based on values of the second order partial derivative matrix, wherein the larger the first order partial derivative value, the smaller the evaluation values.

10. An image processing device comprising:
  derivative value calculating means for calculating a second order partial derivative matrix and at least one first order partial derivative value of a pixel value at each pixel position in an image; and
  an evaluation unit configured to calculate an evaluation value of a likelihood of being a line-like structure at the pixel position based on values of the second order partial derivative matrix, wherein the evaluation unit changes the evaluation value based on a magnitude of the first order partial derivative value.

11. The image processing device as claimed in claim 10, wherein the evaluation unit corrects each of the values of the second order partial derivative matrix depending on a magnitude of the first order partial derivative value that coincides with a second order partial derivative direction of each of the values of the second order partial derivative matrix, and calculates the evaluation value based on the corrected values of the second order partial derivative matrix.

12. The image processing device as claimed in claim 10, wherein the derivative value calculating means calculates the second order partial derivative matrix and the first order partial derivative value with using filters having different sizes, and wherein the filter used to calculate the first order partial derivative value has a size larger than a size of the filter used to calculate the second order partial derivative matrix.

13. The image processing device as claimed in claim 10, wherein the derivative value calculating means applies multi-resolution conversion to the image to obtain resolution images having different resolutions, and calculates the second order partial derivative matrix and the first order partial derivative value with using a filter having a predetermined size at each corresponding pixel position of the resolution images, and wherein the resolution image used to calculate the first order partial derivative value has a resolution lower than a resolution of the resolution image used to calculate the second order partial derivative matrix.

14. The image processing device as claimed in claim 10, wherein the derivative value calculating means calculates the second order partial derivative matrix and the first order partial derivative value using a one-dimensional basic Gaussian kernel, a first order derivative kernel obtained through first order differentiation of the basic Gaussian kernel and a second order derivative kernel obtained through second order differentiation of the basic Gaussian kernel.

15. The image processing device as claimed in claim 10, further comprising segmenting means for segmenting the object area and the background area by setting a likelihood of belonging to an object area, a likelihood of belonging to a background area, and a likelihood of adjacent pixels belonging to the same area for each pixel of the image based on the evaluation values.

16. The image processing device as claimed in claim 15, wherein the segmenting means sets the likelihood of belonging to an object area based on the evaluation value of the likelihood of being a line-like structure.

17. The image processing device as claimed in claim 15, wherein the segmenting means sets the likelihood of belonging to the same area based on an evaluation value of the likelihood of being a line-like structure at the pixel position calculated based only on the values of the second order partial derivative matrix, or based on an evaluation value of the likelihood of being a line-like structure calculated with reducing influence of the first order partial derivative value.

18. An image processing method comprising using a processor to perform the steps of:
 calculating a second order partial derivative matrix and at least one first order partial derivative value of a pixel value at each pixel position in an image; and
 calculating an evaluation value of a likelihood of being a line-like structure at the pixel position based on values of the second order partial derivative matrix, wherein the evaluation value is changed based on a magnitude of the first order partial derivative value.

19. A computer-readable recording medium containing a program for causing a computer to carry out an image processing method comprising:
 calculating a second order partial derivative matrix and at least one first order partial derivative value of a pixel value at each pixel position in an image; and
 calculating an evaluation value of a likelihood of being a line-like structure at the pixel position based on values of the second order partial derivative matrix, wherein the evaluation value is changed based on a magnitude of the first order partial derivative value.

* * * * *

UNITED STATES PATENT AND TRADEMARK OFFICE
CERTIFICATE OF CORRECTION

PATENT NO.       : 8,494,239 B2  
APPLICATION NO.  : 13/040893  
DATED            : July 23, 2013  
INVENTOR(S)      : Yoshiro Kitamura Page 1 of 1

It is certified that error appears in the above-identified patent and that said Letters Patent is hereby corrected as shown below:

On the Title Page

Item "(75) Inventor: Yoshiro Kitamura, I, Tokyo (JP)"

should be replaced with

--(75) Inventor: Yoshiro Kitamura, Tokyo (JP)--

Signed and Sealed this  
First Day of October, 2013

Teresa Stanek Rea  
*Deputy Director of the United States Patent and Trademark Office*